(12) United States Patent
Smith et al.

(10) Patent No.: US 11,550,580 B2
(45) Date of Patent: Jan. 10, 2023

(54) SYSTEMS AND METHODS FOR EMULATING A PROCESSOR

(71) Applicants: Jared N. Smith, Riverdale, UT (US); Matthew W. Senecal, Kaysville, UT (US)

(72) Inventors: Jared N. Smith, Riverdale, UT (US); Matthew W. Senecal, Kaysville, UT (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 144 days.

(21) Appl. No.: 17/183,908

(22) Filed: Feb. 24, 2021

(65) Prior Publication Data
US 2022/0269507 A1  Aug. 25, 2022

(51) Int. Cl.
*G06F 9/30* (2018.01)
*G06F 9/38* (2018.01)
(Continued)

(52) U.S. Cl.
CPC ...... *G06F 9/30145* (2013.01); *G06F 9/30098* (2013.01); *G06F 9/3836* (2013.01); *G06K 9/6256* (2013.01); *G06N 3/08* (2013.01)

(58) Field of Classification Search
None
See application file for complete search history.

(56) References Cited

U.S. PATENT DOCUMENTS

| 6,609,247 B1 * | 8/2003 | Dua ............. G06F 11/3636 |
| | | 714/E11.212 |
| 10,412,099 B2 * | 9/2019 | Cohen ............. H04L 63/1416 |

(Continued)

FOREIGN PATENT DOCUMENTS

| EP | 3742389 A1 * | 11/2020 | ............. G06N 3/0445 |
| WO | WO-2020113237 A1 * | 6/2020 | ............. A61B 5/4836 |

OTHER PUBLICATIONS

Demir: "Ensemble Methods: Elegant Techniques to ProduceImproved Machine Learning Results"; www.toptal.com/machine-learning/ensemble-methods-mahcine-learning; Dec. 11, 2020.
(Continued)

*Primary Examiner* — Steven G Snyder
(74) *Attorney, Agent, or Firm* — Tarolli, Sundheim, Covell & Tummino LLP (57) ABSTRACT

In an example, a machine learning (ML) processor emulator can be configured to emulate a legacy processor for emulating a legacy program. The emulator environment can include virtual registers storing operand data on which an operation is to be performed based on a respective instruction from instruction data representative of the legacy program. The ML processor emulator includes a processor ensemble engine that includes ML modules generated by a different ML algorithm, and a voting engine. Each ML module can be configured to emulate an instruction set of a processor and process the operand data according to the operation of the respective instruction to produce a set of candidate result data. The voting engine can be configured to identify a subset of candidate result data from the set of candidate result data and provide output data with content similar to the subset of candidate result data.

20 Claims, 3 Drawing Sheets

(51) Int. Cl.
*G06N 3/08* (2006.01)
*G06K 9/62* (2022.01)

(56) References Cited

U.S. PATENT DOCUMENTS

| | | | |
|---|---|---|---|
| 10,452,989 B2* | 10/2019 | Majumdar | G06F 9/45504 |
| 10,659,490 B1* | 5/2020 | Ryon | G05B 23/0235 |
| 11,010,657 B2* | 5/2021 | Bhattacharjee | G06N 3/02 |
| 11,038,903 B2* | 6/2021 | Cohen | H04L 63/1425 |
| 2016/0328253 A1* | 11/2016 | Majumdar | G06N 10/00 |
| 2017/0300805 A1* | 10/2017 | Bhattacharjee | G06N 3/02 |
| 2017/0374083 A1* | 12/2017 | Cohen | H04L 63/1416 |
| 2018/0046920 A1* | 2/2018 | Yang | G06N 3/0445 |
| 2020/0014708 A1* | 1/2020 | Cohen | H04L 63/1425 |
| 2020/0372682 A1* | 11/2020 | Kim | G06N 3/08 |
| 2022/0137583 A1* | 5/2022 | Lovegrove | G06N 3/08 |
| | | | 700/48 |

OTHER PUBLICATIONS

Guo, et al.: "Accelerating Architectural Simulation Via Statistical Techniques: A Survey"; IEEE Transaction on Computer-Aided Design of Integrated Circuits and Systems, 2015.

Kasim, et al.: "Building high accuracy emulators for scientific simulations with deep neural architecture search"; arXiv:2001.08055v2 [stat.ML] Oct. 8, 2020.

* cited by examiner

SYSTEMS AND METHODS FOR EMULATING A PROCESSOR

TECHNICAL FIELD

The present disclosure relates to systems and methods for emulating a processor.

BACKGROUND

A processor or processing unit is a digital circuit that performs operations on some external data source, usually memory or some other data stream. It typically takes the form of a microprocessor, which can be implemented on a single metal-oxide-semiconductor integrated circuit chip. A central processing unit (CPU) is an electronic circuit that is configured to execute instructions that define a computer program. The CPU performs basic arithmetic logic, controlling, and input/output (I/O) operations specified by the instructions in the computer program. In computing, a legacy system is an old method, technology, computer system, or program (e.g., application program) "of, relating to, or being a previous or outdated computer system." yet still in use.

Machine learning (ML) is a subset of artificial intelligence in which a computer uses algorithms and statistical models to accurately perform tasks without using explicitly coded instructions after having analyzed a learning or training data set, in effect relying on patterns and inferences to generalize from past experiences. ML-based systems can be capable of solving problems not previously seen or considered and for which it would not be possible to code for every individual case. Types of ML algorithms include, among others, supervised learning, unsupervised learning, and feature learning. Types of ML models that can be trained on the training data include artificial neural networks, decision trees, support vector machines, regression analysis models, Bayesian networks, genetic algorithms, principal components analysis, and cluster analysis.

SUMMARY

The present disclosure relates to systems and methods for emulating a processor.

In an example, a system can include an ML processor emulator that can be configured to provide an emulation environment for emulating a legacy program. The emulator environment can include virtual registers storing operand data on which an operation is to be performed based on a respective instruction from instruction data representative of the legacy program. The ML processor emulator can include a processor ensemble engine that can include ML modules and a voting engine. Each ML module can be generated by a different ML algorithm of a plurality of different ML algorithms, and each ML module can be configured to emulate an instruction set of a legacy processor. Each of the ML modules can be configured to process the operand data according to the operation of the respective instruction to produce a set of candidate result data. The voting engine can be configured to identify a subset of candidate result data from the set of candidate result data and provide output data with content similar to the subset of candidate result data.

In yet another example, a system can include memory to store machine readable instructions and data and one or more processors to access the memory and execute the instructions. The instructions can include an ML processor emulator that can be programmed to provide an emulator environment for emulating a legacy program. The emulator environment can include virtual registers storing operand data on which an operation is to be performed based on a respective instruction from instruction data representative of the legacy program. The ML processor emulator can include an execution engine that can be programmed to parse the respective instruction of the instruction data to identify the operand data on which the operation is to be performed based on the respective instruction and store the operand data in the virtual registers in response to the parsing. The ML processor emulator can further include a processor ensemble engine that can include ML modules and a voting engine. Each ML module can be generated by a different ML algorithm of a plurality of different ML algorithms, and each ML module can be programmed to emulate an instruction set of a legacy processor. Each of the ML modules can be programmed to process the operand data according to the operation of the respective instruction to produce a set of candidate result data. The voting engine can be programmed to identify a subset of candidate result data from the set of candidate result data and provide output data with content similar to the subset of candidate result data.

In a further example, a method can include receiving computer code that can include a set of instructions representative of a legacy program, parsing a respective instruction of the set of instruction to identify operand data on which an operation is to be performed based on the respective instruction, storing the operand data in virtual registers in response to the parsing, and communicating the respective instruction to a processor ensemble engine that can include a set of ML modules. Each ML module of the set of ML modules can be generated by a different ML algorithm of a plurality of different ML algorithms. The method can further include decoding at each ML module of the set of ML modules the respective instruction, retrieving at each ML module of the set of ML modules the operand data at the virtual registers based on the decoding, processing at each ML module of the set of ML modules the operand data based on the operation of the respective instruction to generate a set of candidate result data, applying a voting algorithm to the candidate result data to identify a subset of candidate result data having similar content therein, and generating output data with content similar to the subset of candidate result data.

DETAILED DESCRIPTION

The present disclosure relates to systems and methods for emulating a processor. As legacy systems age and thus the underlying technology (e.g., legacy processor), it can be difficult to repair or replace such systems as the legacy hardware may no longer be supported. As such, software modernization and sustainment of legacy software on legacy systems is becoming challenging. That is, the aging of legacy hardware increases software sustainment issues, which raises the cost of maintaining such systems. During operation, the legacy software is translated from high-level program code into a set of instructions (lower level machine code) and executed by the legacy processor of the legacy system to implement the legacy software. However, if the legacy system suffers a failure, and is replaced with a non-legacy system (e.g., a modern system), the legacy software cannot be executed as the legacy software is limited to run on the legacy processor, which has a different instruction set architecture (ISA) than a processor of the non-legacy system.

Custom emulators can be used to provide an emulation environment that simulates the legacy system (e.g., the legacy processor) and thus enables the legacy software to be run based on truth data. The truth data is collected by monitoring the behavior of the legacy system and is used to reproduce the behavior of the legacy system. Thus, a software equivalent of the legacy processor can be created for execution of the legacy software. The creation of a legacy processor emulator is created by defining separate classes for performing instructions, managing register contents, etc. The legacy processor emulator is adjusted to match a behavior of the legacy processor as described by the truth data. This is done by a cyclical process of testing the legacy processor emulator against the truth data, and making adjustments to program code of the legacy processor emulator. A substantial amount of development time and costs needs to be allocated to test and adjust the legacy processor emulator to closely match the behavior of the legacy processor and thus create a complete code-based solution (e.g., an emulator that matches with a high degree of certainty or confidence the behavior of the legacy processor).

Systems and methods are describing here for emulating processors using an ML framework. As described herein, the ML framework can be generated efficiently and effectively to emulate processors, such as legacy processors. The system and methods described herein enable for rapid use of legacy program code in a non-legacy environment. Thus, as existing legacy systems are taken offline or become inoperable these systems can be replaced with a non-legacy system configured with a processor emulator that allows for execution of the legacy software, and thus prolong the software life of the legacy software. As described herein, an ML processor emulator can be configured to emulate a legacy processor environment and execute the legacy software. As such, the systems and methods described herein eliminate the need to create a complete code-based solution and reduce the amount of time needed for developing an emulator environment for the legacy software.

In some examples, the ML processor emulator includes an ensemble (group) of ML modules that can be generated by different ML algorithms and trained to simulate a processor (e.g., a central processing unit (CPU)). Although examples are described herein wherein the processor is a legacy processor, the examples herein should not be construed and/or limited to only emulating legacy processors. The system and methods described herein can be used to emulate any processor type. Each ML module can be configured to emulate the processor. Each ML algorithm can be trained on processor inputs and outputs based on one or more processor instructions to emulate a behavior of the processor. The ML modules can be configured to operate in parallel (e.g., simultaneously) to emulate an instruction (e.g., a single-precision compare instruction) based on input data (e.g., a 32-bit input) to produce output data (e.g., a 4-bit output). For example, an execution engine of the ML processor emulator can be configured to cause each of the ML modules to execute a corresponding instruction based on the input data to provide the output data.

Thus, each of the ML modules can process the input data according to at least one operation of an instruction set for the processor to produce result data representative of machine code. Each output of the ML module can be provided to a voting engine of the ML processor emulator. The voting engine can be configured to employ majority and/or plurality voting to draw a consensus as to an actual output (e.g., a predicted output) that should be provided by the ML processor emulator. While examples are presented herein wherein the voting engine is configured to employ one of a majority and/or plurality voting algorithm, in other examples a different voting algorithm can be used, such as a voting classifier. By emulating the legacy processor using an ensemble of ML modules and a voting scheme enables rapid modeling of the legacy processor in a software environment (e.g., on non-legacy systems) without requiring a custom emulator to be coded, which is costly and time-consuming.

Figure 1:
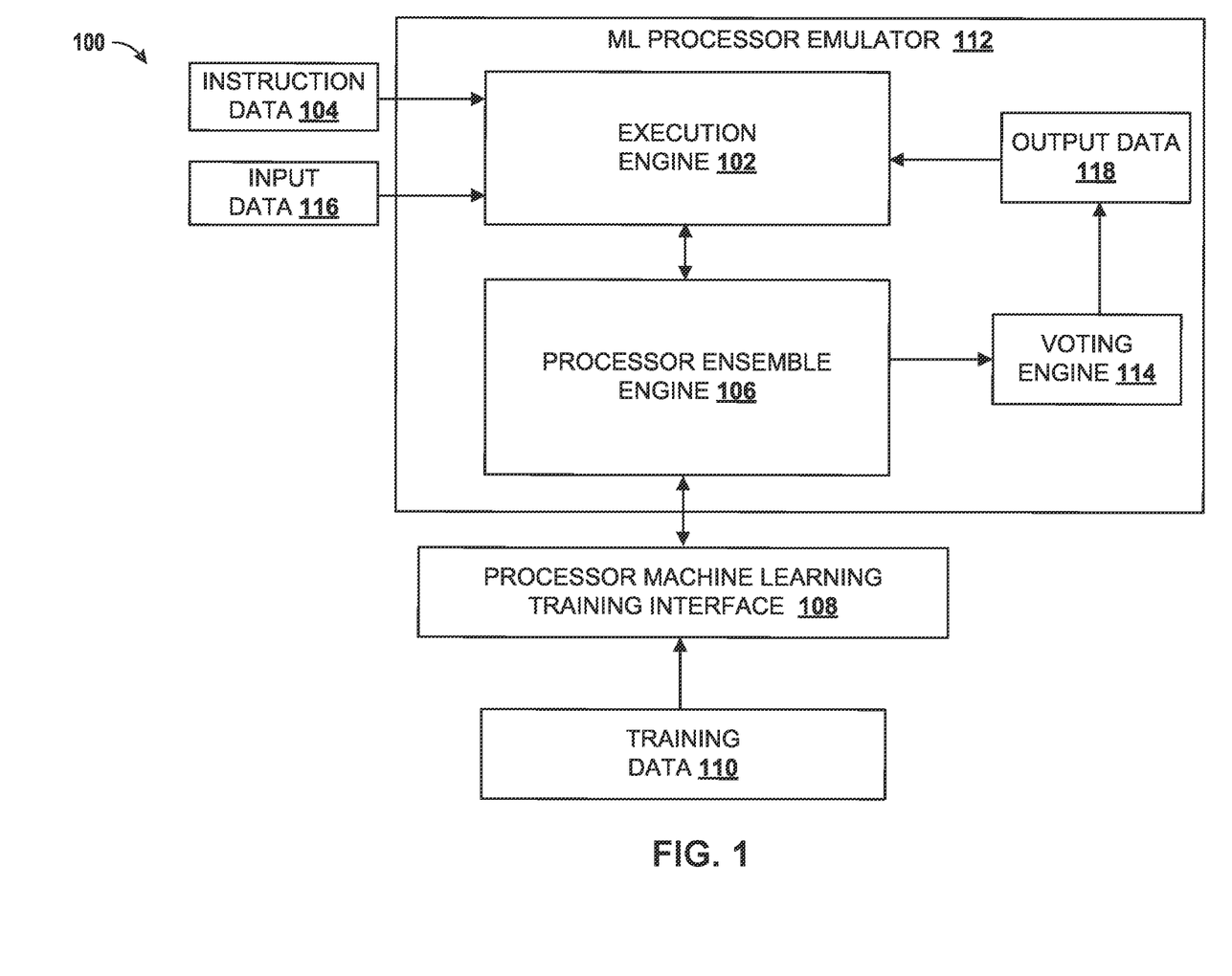
FIG. 1 is an example of a ML processor emulator system.

FIG. 1 is an example of an ML processor emulator system 100. The ML processor emulator system 100 can be implemented on a server, a cloud environment, a computer, such as a laptop computer, a desktop computer, a tablet computer, a workstation, a server, or the like. In some examples, the ML processor emulator system 100 can be implemented on an embedded system. In other examples, the ML processor emulator system 100 can be implemented on a hardware accelerator (e.g., an AI accelerator). In some examples, the ML processor emulator system 100 can be implemented as machine readable instructions that can be stored in memory of a computer. The computer can include one or more processing units. The one or more processing units can be configured to access the memory and execute the machine readable instructions stored in the memory, and thereby execute the ML processor emulator system 100.

The ML processor emulator system 100 includes an execution engine 102. The execution engine 102 can be configured to control an execution of ML modules based on instruction data 104. The instruction data 104 can include a set of instructions characterizing a legacy program (or software). Each of the ML modules as described herein can emulate a behavior and thus an operation of a processor. In some examples, the processor can be a legacy processor. By way of example, the processor can be a Reduced Instruction Set Computer (RISC) processor, a complex instruction set computer (CISC) processor, a minimal instruction set computer (MISC) processor, a very long instruction (VLIW) processor, explicitly parallel instruction computing (EPIC), one instruction set computer (DISC), or a zero instruction set computer (ZISC). In other examples, the processor may be configured to operate according to a different ISA.

The ML processor emulator system 100 includes a processor ensemble engine 106. The processor ensemble engine 106 can include the ML modules, which can be generated by a set of ML algorithms. By way of example, the set of ML algorithms can include at least two of an artificial neural network (ANN), a decision tree, a recurrent neural network (RNN), a convolutional neural network (CNN), and reinforcement Q-learning. The set of ML algorithms can include other types of ML algorithms. To train each of the ML algorithms, in some examples, the ML processor emulator system 100 can include a processor training interface 108. In some examples, the processor training interface 108 can include the set of ML algorithms that are used to generate the ML modules as described herein. The processor training interface 108 can be configured to train each of the ML algorithms to generate the ML modules based on training data 110. Each ML module can be generated by a respective ML algorithm of the set of ML algorithms, and each ML module can be configured to emulate an instruction set of the processor.

For example, a first ML algorithm can be trained by the processor training interface 108 based on the training data 110 to generate a first ML module that emulates a behavior of the processor. A second ML algorithm can be trained by the processor training interface 108 based on the training data 110 to generate a second ML module that emulates a behavior of the processor. Thus, each ML module of the processor ensemble engine 106 can be trained to emulate the processor. By way of example, the processor training interface 108 can be configured to determine weights and/or parameters for each ML algorithm based on a subset of the training data 110. In some examples, another subset of the training data 110 can be used for verifying the training of each of the ML algorithms.

For example, the training data 118 can include binary instruction data indicative of a set of instructions that can be implemented by the processor. In some examples, the training data 118 can include binary operand data on which at least one instruction of the set of instructions can be performed. The registers can be virtual registers. For example, during a training phase, the processor training interface 108 can be configured to determine a respective set of weights and/or parameters for each of the ML algorithms to represent operations that can be performed by the processor based on the binary instruction and operand data. The processor training interface 108 can be configured to evaluate an output of each of the ML algorithms during each training iteration to determine whether the output matches an intended output for the processor based on a corresponding instruction of the set of instructions.

For example, the binary operand data can be processed by a respective ML algorithm based on a corresponding set of weights and/or parameters. The corresponding set of weights and/or parameters can be determined based on the binary instruction data and thus can be representative of a given instruction of the set of instructions. The output of the respective ML algorithm can be evaluated by the processor training interface 108 to determine whether the output matches the intended output. By way of example, if the corresponding instruction is a compare instruction, and the binary operand data includes a first set of bits (e.g., 8 bits) and a second set of bits (e.g., 8 bits), the respective ML algorithm can be configured to provide binary output data indicative of whether the first set of bits equals the second set of bits, the first set of bits is less than the second set of bits, and the first set of bits is greater than the second set of bits. For example, 0010 can indicate that the first set of bits is equal to the second set of bits, 0001 can indicate that the first set of bits is less than the second set of bits, and 0100 can indicate that the first set of bits is greater than the second set of bits.

In some examples, each of the ML algorithms can be configured to output a respective ML module. The processor ensemble engine 106 can include the outputted respective ML modules. The execution engine 102, the processor ensemble engine 106 and the processor training interface 108 can define a ML processor emulator 112. In some examples, the ML processor emulator 112 can include a voting engine 114. While the example of FIG. 1 illustrates the ML processor emulator 112 as being employed on the ML processor emulator system 100, in other examples, the ML processor emulator 112 can be employed on another system (e.g., another non-legacy system) to emulate the processor.

The ML processor emulator 112 can be executed to provide an emulator environment for emulating the behavior of the legacy processor. In some examples, the ML processor emulator 112 can be configured to define virtual registers in the emulator environment for use by each of the ML modules. As described herein, the virtual registers can store data on which operations are to be performed based on a corresponding instruction. In some examples, the legacy program can be translated to legacy computer code for use by the ML processor emulator 112. The legacy computer code can include a set of instructions for running the legacy program corresponding to operations that are to be performed by each of the ML modules of the processor ensemble engine 106. In some examples, the data on which operations are to be performed based on the set of instructions can be represented as input data 118 in FIG. 1. In some examples, the input data 118 can be referred to as input operand data. In some examples, the execution engine can include a controller. The controller can be configured to parse each instruction and retrieve the input data 116 stored in memory based on a respective parsed instruction. The controller can be configured to store (e.g., load) the input data 116 at the virtual registers. The virtual registers can be accessed by each of the ML modules to retrieve the stored input data 116 for processing, as described herein.

In some examples, the instruction data 104 can include the compare instruction. The execution engine 102 can be configured to load the input data 116 for the compare instruction (e.g., by determining wherein in the memory the input data 116 is stored based on the instruction data 104). In some examples, the execution engine 102 can be configured to provide the instruction data 104 to each of the ML modules of the processor ensemble engine 106. Each of the ML modules can be configured to decode (e.g., interpret) the instruction (e.g., determine a type of instruction that is to be executed). Each of the ML modules of the processor ensemble engine 106 can be configured to retrieve the input data 116 that has been loaded by the execution engine 102 into the virtual registers based on the decoded instruction.

In some examples, each of the ML modules of the processor ensemble engine 106 can be configured to process the retrieved input data 116 based on the decoded instruction to provide result data. The result data can be a binary representation of a result of the processed input data 116 based on the decoded instruction. In some examples, the result data provided by each of the ML modules may be referred to as a candidate result data. The candidate result data provided by each of the ML modules can be further evaluated herein to determine output data 118. The output data 118 can be a consensus representation of result data among the candidate result data provided by the ML modules. In some examples, the output data 118 is the candidate result data provided by the respective ML module of the ML modules of the processor ensemble engine 106.

In some examples, the voting engine 114 can be configured to employ a majority and/or a plurality voting algorithm. For example, the voting engine 114 can be configured to evaluate the candidate result data provided by ML modules of the processor ensemble engine 106 to identify a number of similar candidate result data. The voting engine 114 can be configured to compare the number of similar candidate result data to a voting threshold. The voting engine 114 can be configured to provide the output data 118 with the binary information that mirrors the candidate result data that is similar in response to determining that the number of similar candidate result data is equal to or greater than the voting threshold. In some examples, the voting engine 114 can be configured to evaluate the candidate result data from each ML module to identify the binary information that is a majority or a plurality among the binary information from the candidate result data. By employing the voting engine 114 increases an accuracy of identifying result data that is most similar to result data provided by the legacy processor. In some examples, the output data 118 can be provided to the execution engine 102. The execution engine 102 can be configured to store the output data 118 in the virtual registers or the memory (in some examples for a subsequent instruction of the instruction data 104). By emulating the legacy processor using the ML processor emulator 112 enables for rapid modeling of the legacy processor in a software environment (e.g., on non-legacy systems) without requiring a custom emulator to be coded.

Figure 2:
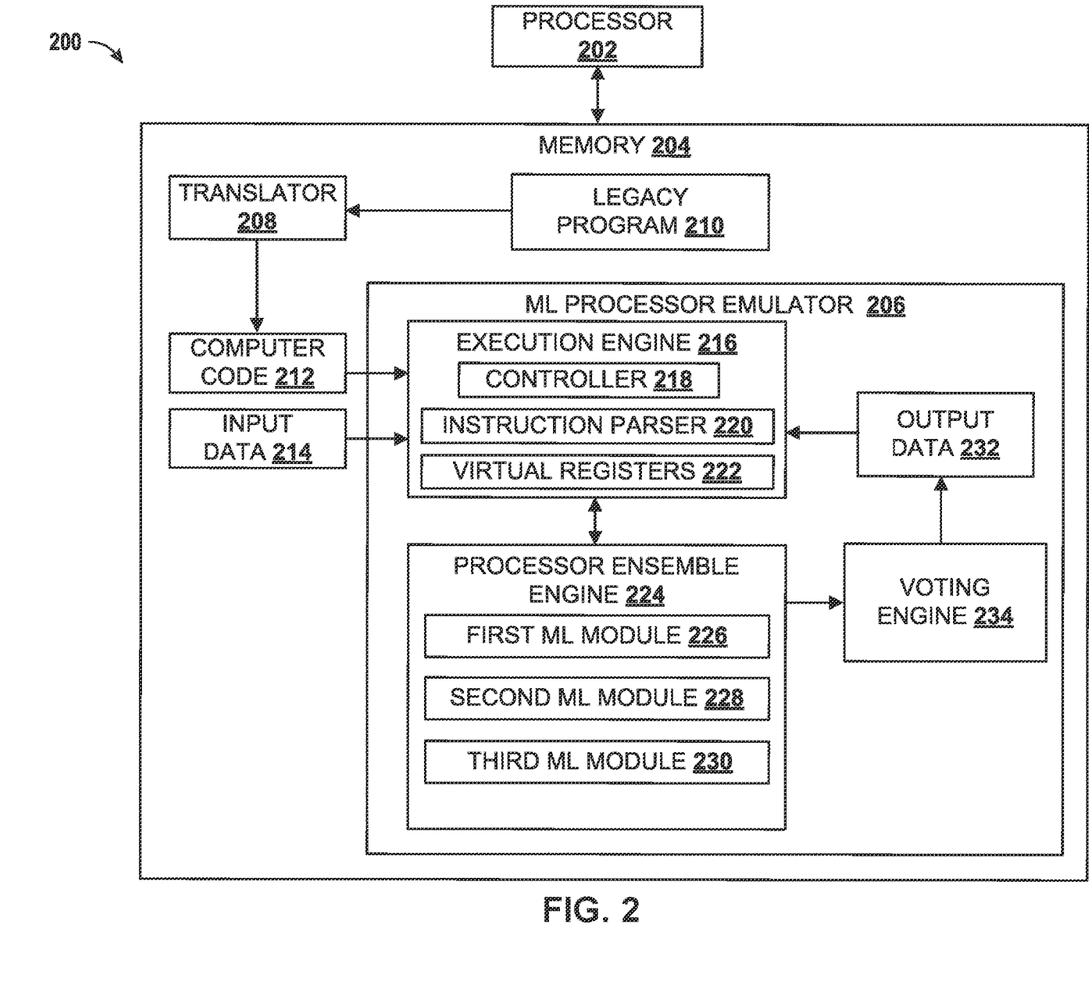
FIG. 2 is an example of a computing system.

FIG. 2 is an example of a computing system 200. The computing system 200 can be implemented on a computer, such as a laptop computer, a desktop computer, a tablet computer, a workstation, or the like. In some examples, the computing system 200 includes a processor 202 and memory 204. The memory can be implemented, for example, as a non-transitory computer storage medium, such as volatile memory (e.g., random access memory), non-volatile memory (e.g., a hard disk drive, a solid-state drive, flash memory, or the like), or a combination thereof. The processor 202 can be configured to access the memory 204 and execute the machine-readable instructions stored in the memory 204, and thereby execute an ML processor emulator 206. The ML processor emulator 206 can correspond to the ML processor emulator 112, as shown in FIG. 1. Thus, in some examples, reference can be made to the example of FIG. 1 in the following description of FIG. 2. In the present example of FIG. 2, although the components of the computing system 200 are illustrated as being implemented on the same system, in other examples, the different components could be distributed across different systems (e.g., computers, devices, etc.) and communicate, for example, over a network (e.g., a wireless and/or wired network).

In some examples, the computing system 200 may be referred to as a non-legacy computing system. The ML processor emulator 206 can be programmed to emulate a behavior of a processor to enable legacy software to operate in a non-legacy computing environment. By way of example, mission software (e.g., mission flight management software) that has been time-tested and proven reliable in some instances is run on legacy computing systems (e.g., decades-old hardware) that cannot be easily repaired or replaced. As such systems continue to age, software sustainment issues increase, raising the cost of maintaining such systems. By configuring the computing system 200 with the ML processor emulator 206, legacy software can be enabled to run on non-legacy hardware.

In some examples, the memory 204 includes a translator 208. The translator 208 can be programmed to receive a legacy program 210. The legacy program 210 can be written in a programming language (e.g., high-level language, such as C++, Java, and the like) to perform a task and/or function. In some examples, the legacy program 210 is the legacy software (e.g., the mission software). The translator 208 can be programmed to translate the legacy program 210 into computer code 212. The computer code 212 can include a set of instructions for executing the legacy program 210. The memory can include input data 214 on which one or more operations are to be performed based on one or more instructions of the set of instructions of the computer code 214. In some examples, the computer code 118 can correspond to the instruction data 104 and the input data 214 can correspond to the input data 116, as shown in FIG. 1.

The processor emulator 206 includes an execution engine 216. The execution engine 216 employs a controller 218. The controller 218 can be programmed to communicate with an instruction parser 220. The controller 218 can be programmed to provide a respective instruction of the computer code 212 to the instruction parser 220 to parse each instruction. For example, the instruction parser 220 can be programmed to determine or identify data on which an operation is to be performed as specified by the respective instruction. The controller 218 can be programmed to generate or setup virtual registers 222. While the example of FIG. 2 illustrates the virtual registers 222 as part of the execution engine 216, in other examples, the virtual registers 222 can be located outside the execution engine 216. The controller 218 can be programmed to retrieve from the memory 204 (or external memory) the identified data by the instruction parser 220 and store the identified data as the input data 214 in the virtual registers 222. In some examples, the controller 218 can be programmed to communicate with a processor ensemble engine 224, for example, in response to storing the input data 214 in the virtual registers 222. The controller 218 can be programmed to provide the respective instruction to the processor ensemble engine 224.

The processor ensemble engine 224 can include first, second, and third ML modules 226, 228, and 230. For example, the first ML module 226 can be generated by a first ML algorithm, the second ML module 228 can be generated by a second ML algorithm, and the third ML module 228 can be generated by a third ML algorithm. The first, second, and third ML modules 226, 228, and 230 can be generated during a training phase of the processor ensemble engine 224 in the same or similar manner as described herein with the processor ensemble engine 106, as shown in FIG. 1. Each of the first, second, and third ML modules 226, 228, and 230 can be generated by a different ML algorithm. While the example of FIG. 2 illustrates three ML modules, in other examples, more or less than three ML modules may be employed at the processor ensemble engine 224. For example, a number of ML modules that can be employed as part of the processor ensemble engine 224 can be a function of the computing power of the computing system 200.

Each of the first, second, and third ML modules 226, 228, and 230 can be programmed to decode (e.g., interpret) the respective instruction (e.g., determine a type of instruction that is to be executed). In some examples, each of the first, second, and third ML modules 226, 228, and 230 can be programmed to retrieve the input data 214 stored at the virtual registers 222 based on the decoded instruction. In some examples, each of the first, second, and third ML modules 226, 228, and 230 can be configured to process the retrieved input data 214 based on the decoded instruction to provide candidate result data. The candidate result data provided by each of the first, second, and third ML modules 226, 228, and 230 can be further evaluated herein to generate output data 232. The output data 232 can be a consensus representation of candidate result data among the candidate result data provided by each of the first, second, and third ML modules 226, 228, and 230. In some examples, the output data 232 is the candidate result data provided by one of ML modules of the ML modules 226, 228, and 230. The output data 232 can correspond to the output data 118, as shown in FIG. 1.

In some examples, to determine the consensus among the candidate result data, the processor emulator 206 employs a voting engine 234. In some examples, the voting engine 234 can be programmed to employ a majority and/or a plurality voting algorithm. For example, the voting engine 234 can be programmed to evaluate the candidate result data provided by each of the first, second, and third ML modules 226, 228, and 230 to identify a number of similar candidate result data. The voting engine 234 can be programmed to compare the number of similar candidate result data to a voting threshold. The voting engine 234 can be programmed to provide the output data 232 with the binary information that mirrors the candidate result data that is similar in response to determining that the number of similar candidate result data is equal to or greater than the voting threshold. In some examples, the voting engine 234 can be programmed to evaluate the candidate result data from each of the first, second, and third ML modules 226, 228, and 230 to identify the binary information that is a majority or a plurality among the binary information from the candidate result data. By employing the voting engine 234 increases an accuracy of identifying result data that is most similar to result data provided by the legacy processor. In some examples, the output data 234 can be provided to the execution engine 216. The execution engine 216 can be programmed to store the output data 232 in the virtual registers 222 or in the memory 204 (in some examples for a subsequent instruction of the computer code 212). By emulating the legacy processor using the ML processor emulator 206 enables for rapid modeling of the legacy processor in a software environment (e.g., on non-legacy systems) without requiring a custom emulator to be coded.

Figure 3:
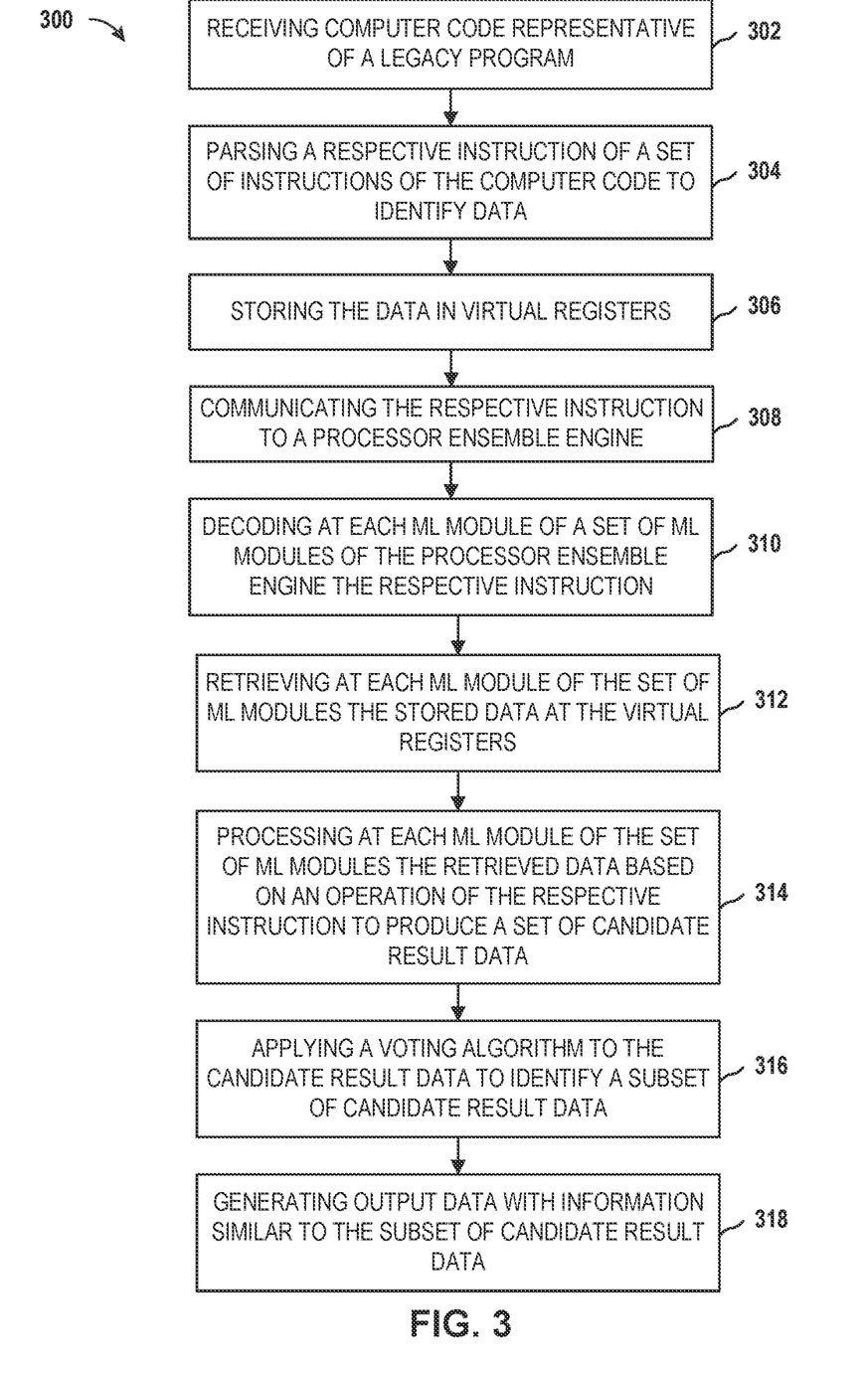
FIG. 3 is an example of a method for executing a legacy program on a non-legacy system.

In view of the foregoing structural and functional features described above, an example method will be better appreciated with references to FIG. 3. While, for purposes of simplicity of explanation, the example method of FIG. 3 is shown and described as executing serially, it is to be understood and appreciated that the example method is not limited by the illustrated order, as some actions could in other examples occur in different orders, multiple times and/or concurrently from that shown and described herein.

FIG. 3 is an example of a method 300 for executing a legacy program on a non-legacy system. The method 300 can be implemented by the ML processor emulator 112, as shown in FIG. 1, or the ML processor emulator 206, as shown in FIG. 2. Thus, in some examples, references can be made to the examples of FIGS. 1 and 2 in the following description of FIG. 3. The method 300 can begin at 302 by receiving (e.g., the execution engine 216, as shown in FIG. 2) computer code (e.g., the computer code 212, as shown in FIG. 2) that includes a set of instructions representative of a legacy program (e.g., the legacy program 208, as shown in FIG. 2). At 304, parsing (e.g., via the instruction parser 220, as shown in FIG. 2) a respective instruction of the set of instruction to identify data (e.g., the input data 214, as shown in FIG. 2) on which an operation is to be performed as defined by the respective instruction. At 306, storing the data in virtual registers (e.g., the virtual registers 222, as shown in FIG. 2) in response to the parsing.

At 308, communicating the respective instruction to a processor ensemble engine (e.g., the processor ensemble engine 224, as shown in FIG. 2) that includes a set of ML modules (e.g., the first, second, and third ML modules 226, 228, and 230, as shown in FIG. 2). Each ML module of the set of ML modules can be generated by a different ML algorithm. At 310, decoding at each ML module of the set of ML modules the respective instruction. At 312, retrieving at each ML module of the set of ML modules the stored data at the virtual registers. At 314, processing at each ML module of the set of ML modules the retrieved data based on the operation of the respective instruction to produce a set of candidate result data. At 316, applying a voting algorithm (e.g., at the voting engine 234, as shown in FIG. 2) to the candidate result data produced by the set of ML modules to identify a subset of candidate result data with similar information from the set of candidate result data. At 318, generating output data (e.g., the output data 232, as shown in FIG. 2) with information similar to subset of candidate result data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
a machine learning (ML) processor emulator configured to provide an emulation environment for emulating a legacy program, the emulator environment comprising virtual registers storing operand data on which an operation is to be performed based on a respective instruction from instruction data representative of the legacy program, the ML processor emulator comprising:
a processor ensemble engine comprising ML modules, each ML module being generated by a different ML algorithm of a plurality of different ML algorithms, and each ML module being configured to emulate an instruction set of a legacy processor, each of the ML modules being configured to process the operand data according to the operation of the respective instruction to produce a set of candidate result data; and
a voting engine configured to identify a subset of candidate result data from the set of candidate result data and provide output data with content similar to the subset of candidate result data.

2. The system of claim 1, the ML processor emulator further comprising:
a controller configured to receive the instruction data representative of the legacy program; and
an instruction parser configured to parse the respective instruction of the instruction data to identify the operand data on which the operation is to be performed based on the respective instruction, the operand data being stored in the virtual registers.

3. The system of claim 2, wherein the voting engine is configured to apply a voting algorithm to the set of candidate result data to identify the subset of candidate result data.

4. The system of claim 3, wherein the voting algorithm comprises one of a majority voting algorithm and a plurality voting algorithm.

5. The system of claim 3, further comprising a processor training interface comprising the plurality of different ML algorithms, the plurality of different ML algorithms being trained based on training data comprising training instruction data indicative of the instruction set of the legacy processor.

6. The system of claim 5, wherein the processor training interface is configured to determine a respective set of weights and/or parameters for the plurality of different ML algorithms to represent operations that can be performed by the legacy processor based on the training data to generate the ML modules.

7. The system of claim 6, wherein the ML modules comprise at least two of an artificial neural network (ANN) module, a decision tree module, a recurrent neural network (RNN) module, a convolutional neural network (CNN) module, a support-vector machine (SVM) module, and reinforcement Q-learning module.

8. The system of claim 7, wherein the controller is configured to store the output data in the virtual registers.

9. A system comprising:
memory to store machine readable instructions and data; and
one or more processors to access the memory and execute the instructions, the instructions comprising a machine learning (ML) processor emulator programmed to provide an emulator environment for emulating a legacy program, the emulator environment comprising virtual registers storing operand data on which an operation is to be performed based on a respective instruction from instruction data representative of the legacy program, the ML processor emulator comprising:
an execution engine programmed to parse the respective instruction of the instruction data to identify the operand data on which the operation is to be performed based on the respective instruction, and store the operand data in the virtual registers in response to the parsing; and
a processor ensemble engine comprising ML modules, each ML module being generated by a different ML algorithm of a plurality of different ML algorithms, and each ML module being programmed to emulate an instruction set of a legacy processor, each of the ML modules being programmed to process the operand data according to the operation of the respective instruction to produce a set of candidate result data; and
a voting engine programmed to identify a subset of candidate result data from the set of candidate result data and provide output data with content similar to the subset of candidate result data.

10. The system of claim 9: wherein the voting engine is programmed to apply a voting algorithm to the set of candidate result data to identify the subset of candidate result data.

11. The system of claim 10, wherein the voting algorithm comprises one of a majority voting algorithm and a plurality voting algorithm.

12. The system of claim 10, wherein the memory further comprises a processor training interface comprising the plurality of different ML algorithms, the plurality of different ML algorithms being trained based on training data comprising training instruction data indicative of the instruction set of the legacy processor.

13. The system of claim 12, wherein the processor training interface is programmed to determine a respective set of weights and/or parameters for the plurality of different ML algorithms to represent operations that can be performed by the legacy processor based on the training data to generate the ML modules.

14. The system of claim 13, wherein the ML modules comprise at least two of an artificial neural network (ANN) module, a decision tree module, a recurrent neural network (RNN) module, a convolutional neural network (CNN) module, a support-vector machine (SVM) module, and reinforcement Q-learning module.

15. The system of claim 14, wherein the execution engine is programmed to store the output data in the virtual registers.

16. A method comprising:
receiving computer code comprising a set of instructions representative of a legacy program;
parsing a respective instruction of the set of instruction to identify operand data on which an operation is to be performed based on the respective instruction;
storing the operand data in virtual registers in response to the parsing;
communicating the respective instruction to a processor ensemble engine comprising a set of machine learning (ML) modules, each ML module of the set of ML modules being generated by a different ML algorithm of a plurality of different ML algorithms;
decoding at each ML module of the set of ML modules the respective instruction;
retrieving at each ML module of the set of ML modules the operand data at the virtual registers based on the decoding;
processing at each ML module of the set of ML modules the operand data based on the operation of the respective instruction to generate a set of candidate result data;
applying a voting algorithm to the candidate result data to identify a subset of candidate result data having similar content therein; and
generating output data with content similar to the subset of candidate result data.

17. The method of claim 16, further comprising:
training the plurality of different ML algorithms based on training data comprising training instruction data indicative of the instruction set of the legacy processor; and
determining a respective set of weights and/or parameters for the plurality of different ML algorithms represent operations that can be performed by the legacy processor based on the training data to generate the set of ML modules.

18. The method of claim 16, further comprising storing the output data in the virtual registers.

19. The method of claim 18, wherein the set of ML modules comprise at least two of an artificial neural network (ANN) module, a decision tree module, a recurrent neural network (RNN) module, a convolutional neural network (CNN) module, and reinforcement Q-learning module.

20. The method of claim 19, wherein the voting algorithm comprises one of a majority voting algorithm and a plurality voting algorithm.

* * * * *